United States Patent [19]
Gay

[11] 3,951,312
[45] Apr. 20, 1976

[54] GROUND WHEEL DRIVE FOR SPREADER

[75] Inventor: James E. Gay, Fargo, N. Dak.

[73] Assignee: Mobility, Inc., Fargo, N. Dak.

[22] Filed: Oct. 16, 1974

[21] Appl. No.: 515,335

[52] U.S. Cl. .............................. 222/177; 239/673; 239/685
[51] Int. Cl.² ........................................ A01C 17/00
[58] Field of Search ............ 222/177; 239/673, 685

[56] References Cited
UNITED STATES PATENTS

| | | | |
|---|---|---|---|
| 1,643,748 | 9/1927 | Niehaus | 222/177 |
| 1,825,523 | 9/1931 | Higgins | 222/177 |
| 1,891,565 | 12/1932 | May et al. | 222/177 |
| 3,417,926 | 12/1968 | De Vorak | 239/673 |

*Primary Examiner*—Robert B. Reeves
*Assistant Examiner*—John P. Shannon
*Attorney, Agent, or Firm*—Burd, Braddock & Bartz

[57] ABSTRACT

An agricultural fertilizer spreader having a hopper carrying a conveyor operable to move material from the hopper onto rotatable fertilizer distributing discs. A ground wheel, through a gear drive power transmission system, is operable to concurrently operate the conveyor and fertilizer distributing discs. An adjustable support is used to release a driven gear from a drive gear or hold the driven gear in driving relation with the drive gear.

27 Claims, 5 Drawing Figures

GROUND WHEEL DRIVE FOR SPREADER

BACKGROUND OF INVENTION

Machines used to spread granular fertilizer on the soil are trailer-type vehicles having hoppers for carrying the material. An endless conveyor is driven to deliver the material from the bottom of the hopper onto spreading discs. Examples of these machines are shown by Tyler in U.S. Pat. Nos. 3,450,431 and 3,539,133. The conveyors and discs of these machines are driven through a power takeoff structure attached to the towing vehicle. The ground supporting wheels for the machines are not used to drive the conveyor and spreading discs. Some fertilizer spreaders have driven wheels located in frictional engagement with the ground engaging wheels to transmit power from the ground engaging wheels to the spreader disc drive structure. This type of drive is shown in U.S. Pat. Nos. 3,085,807 and 3,220,740. When this drive is used in wet or muddy conditions, there is substantial slippage between the ground engaging wheel and the driven wheel which results in a loss of power and inefficient operation of the material spreading discs. Another ground wheel drive arrangement having a clutch and chain and sprocket drive for operating spreading discs of a fertilizer spreader is disclosed in U.S. Pat. No. 3,184,243.

SUMMARY OF INVENTION

The invention is directed to an apparatus for distributing material onto a location. Specifically, the apparatus is a particulate fertilizer spreader having a hopper, conveyor and distributor operable to spread particulate fertilizer onto the ground. Ground engaging wheel means rotatably support the spreader on the ground. Power transmitting means connect the ground engaging wheel means with the conveyor means and distributor assembly for concurrently operating the conveyor and distributor assembly in response to rotation of the wheel means. The power transmitting means includes cooperating drive and driven gears which drivably connect the wheel means with the conveyor and distributor assembly. The drive gear is attached to the wheel means whereby the drive gear rotates with the wheel means. A support means is selectively adjustable to hold the driven gear in driving relation with the drive gear whereby power is transmitted from the ground engaging wheel to the conveyor means and distributor assembly. The support means can be moved to a release position whereby the driven gear is located in a non-driving location with respect to the drive gear.

An object of the invention is to provide a ground wheel drive arrangement for a conveyor and/or spreader structure of a material distributing machine that is operable under wet and muddy field conditions. A further object of the invention is to provide a material spreading apparatus with a ground drive wheel structure that is operable to increase power to a material conveyor and material spreading structure and is useable to apply large quantities of material in a uniform pattern onto a location, such as an agricultural field. A further object of the invention is to provide a power transmitting arrangement between a ground wheel and a conveyor and spreader structure of a material distributing vehicle that can be disengaged so that the vehicle can be moved without operating the conveyor or material distributing structure. Another object of the invention is to provide an adjustable length support for carrying a driven gear and selectively positioning the driven gear in an operative and an inoperative relation with a drive gear. Yet another object of the invention is to provide a ground wheel drive power transmitting system that is sturdy and reliable in use, easily maintained and repaired, and can be used with different types and sizes of material spreading machines having conveyors and distributing structures.

IN THE DRAWINGS

DESCRIPTION OF PREFERRED EMBODIMENT

Figure 1:
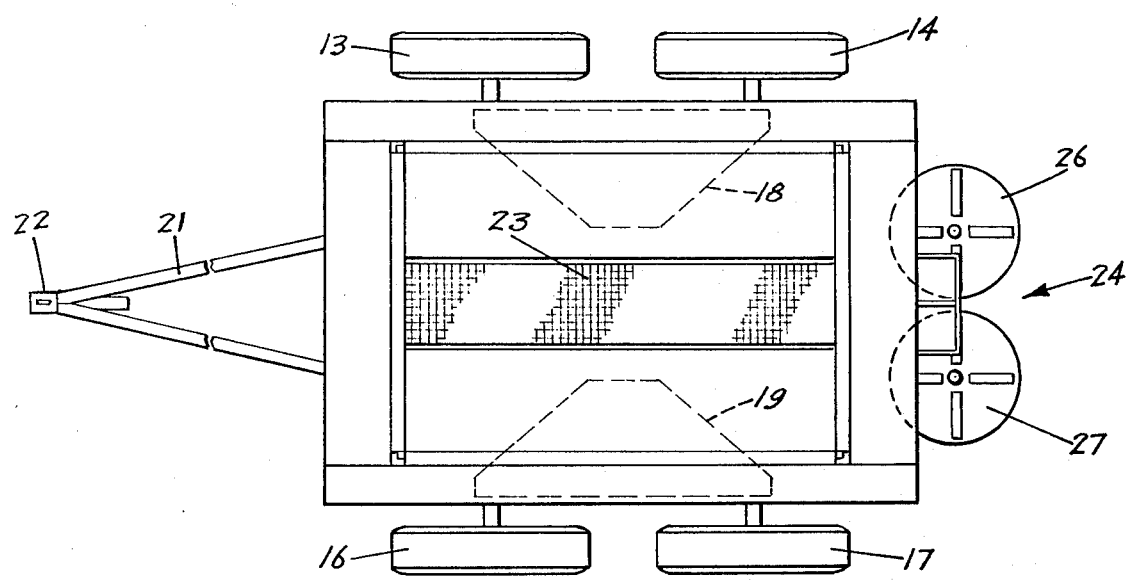
FIG. 1 is a plan view of a material spreading apparatus having the ground wheel drive of the invention.

Referring to FIG. 1, there is shown a material spreading apparatus indicated generally at 10. Apparatus 10 is an agricultural fertilizer spreader used to spread granular fertilizer, lime and like particulate materials on agricultural land. The spreader can be used in other environments as an apparatus to spread material onto a location. For example, apparatus 10 can be used to spread salt, sand and gravel on raods, parking lots and like surfaces. The following description is directed to an agricultural fertilizer spreader as an example of one use of apparatus 10.

Material spreading apparatus 10 has a longitudinal frame 11 carrying a hopper or box 12 for accommodating granular or particulate material. Tandem wheels 13, 14 and 16, 17 are mounted on opposite sides of the frame with walker beams 18 and 19 to make the apparatus a trailer-type vehicle. The forward portion of frame 11 comprises a tongue 21 carrying a hitch 22. Hitch 22 is used to attach the apparatus 10 to a power vehicle, as a tractor, truck or the like (not shown).

An endless conveyor 23 is located along the center portion of the bottom of hopper 12. Conveyor 23 is operable to move material from the bottom of the hopper in a rearward direction onto a distributor assembly indicated generally at 24. Distributor assembly 24 located at the rear of the hopper 12 has a pair of rotatable discs 26 and 27. The material is moved by conveyor 23 onto discs 26 and 27. The rotating discs 26 and 27 spread the material in a low and even distribution pattern behind apparatus 10. The ground wheel drive or power transmitting apparatus 34 of the invention operates both the conveyor 23 and the discs 26 and 27 at speeds in relation to the ground speed of the apparatus.

Figure 2:
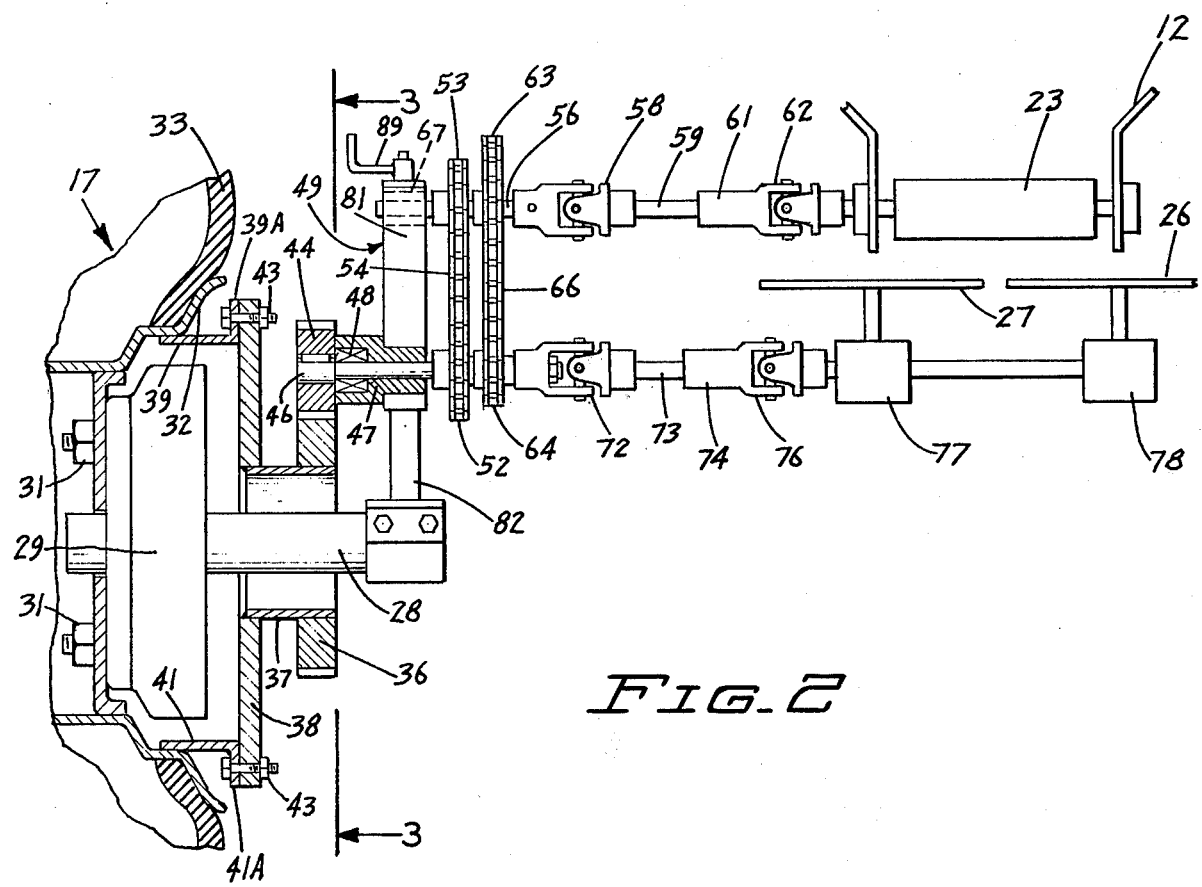
FIG. 2 is a transverse elevational view, partly sectioned, showing the ground wheel drive for the material conveyor and material distributing discs.

Referring to FIG. 2, wheel 17 is rotatably mounted on an outwardly directed axle 28. The inner end of axle 28 is attached to the walking beam 19. A brake drum 29 is rotatably mounted on the axle and connected to wheel 17 with a plurality of nuts or lugs 31. The wheel 17 has a conventional rim 32 carrying a pneumatic tire 33.

Figure 3:
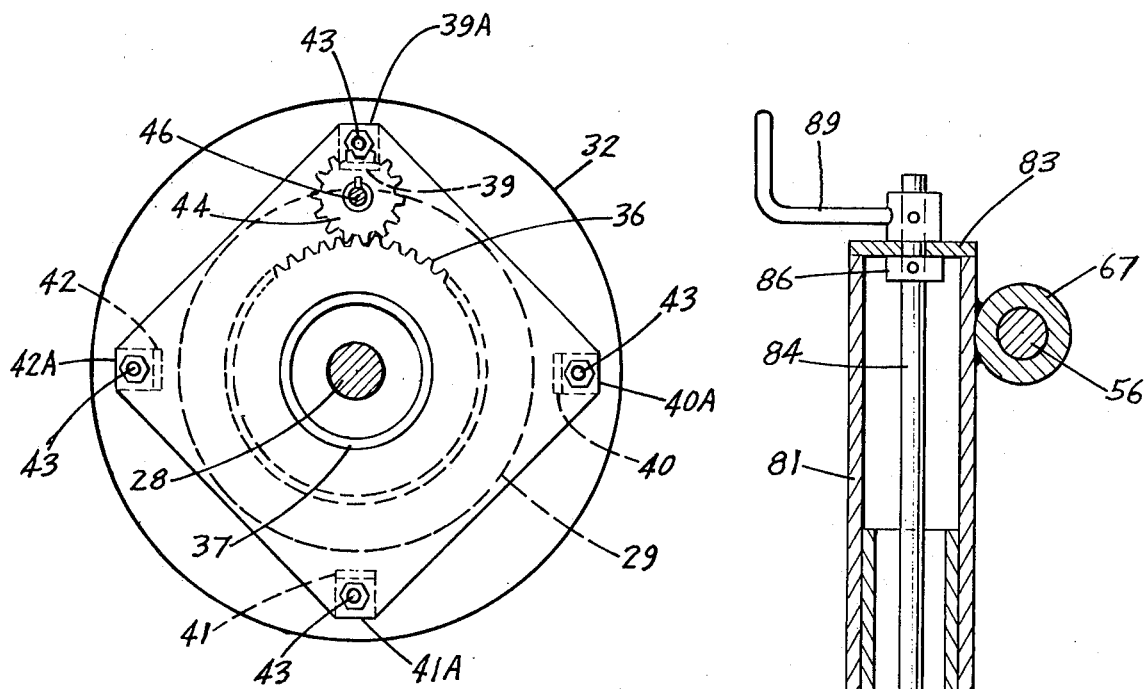
FIG. 3 is an enlarged sectional view taken along line 3—3 of FIG. 2.

The drive of the invention indicated generally at 34 is a power transmission system that drivably connects wheel 17 with the drive structure of conveyor 23 and distributor discs 26 and 27 so that on forward motion of apparatus 10, conveyor 23 and discs 26 and 27 will be operated. Drive 34 comprises a drive spur gear 36 fixed to a tube or hub 37. The outer end of hub 37 is attached to a plate 38. As shown in FIG. 3, plate 38 has a generally square configuration and is located adjacent the inner side of tire rim 32. A plurality of inwardly directed ears or members 38, 39, 40 and 41 are secured by welds or the like to the rim 33. The ears 38, 39, 40 and 41 are spaced equal circumferential distances from each other and are in registration with the corners of plate 38. Each ear has a radially outwardly directed flange 39A, 40A, 41A and 42A having a hole aligned with a hole in the plate 38. Nut and bolt assemblies 43 attach plate 38 to flanges 39A, 40A, 41A and 42A so that drive gear 36 always rotates with wheel 17.

Ground wheel drive 34 has a second spur gear or driven gear 44 located in engagement with the teeth of gear 36. Gear 44 is secured to a shaft 46 with a key or like structure. Shaft 46 is rotatably mounted in a sleeve 47 carrying a bearing 48. Sleeve 47 is secured to an extendable and contractable support 49. The lower end of support 49 is attached with bolts 51 to a portion of walking beam 19. Support 49 is extendable to a position where gear 44 is disengaged from gear 36. Shaft 46 extends through sleeve 47 and carries a first sprocket 52. Sprocket 52 is aligned with a second sprocket 53. An endless roller link chain 54 drivably connects sprockets 52 and 53. Sprocket 53 is mounted on shaft 54 and secured thereto with a key or like structure. Shaft 56 is rotatably mounted in a sleeve member 57 attached to an upper part of support 49. The inner end of shaft 56 is drivably connected to a universal joint 58. Telescopingly related drive members 59 and 61 connect universal joint 58 with a second universal joint 62. Universal joint 62 is connected to the drive roller for conveyor 23. Joint 62 may be connected to other power transmitting means used to drive conveyor 23.

Figure 4:
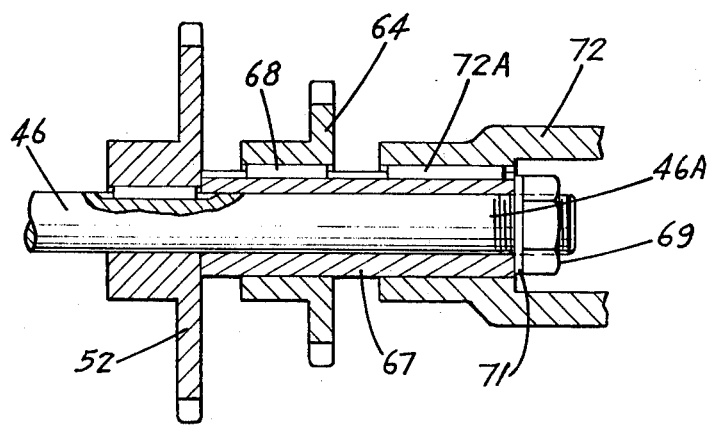
FIG. 4 is an enlarged sectional view of part of the drive.

A third sprocket 63 is mounted on shaft 56 between the sprocket 53 and universal joint 58. Sprocket 63 is aligned with sprocket 64 located adjacent the first sprocket 52. An endless roller chain 66 drivably connects sprockets 63 and 64. Sprocket 63 is larger than sprocket 64 whereby sleeve 67 is rotated faster than shaft 56. Other sprocket size relationships can be used to change the speed ratios between shaft 56 and sleeve 67. Sprocket 63 is mounted on a sleeve or tubular member 67. As shown in FIG. 4, tubular member 67 is rotatably mounted on an outer end portion 46A of the shaft 46. A key 68 drivably connects sprocket 64 to sleeve 67. Sleeve 67 is held in assembled relation with shaft portion 46A with a nut 69 threaded on the end of shaft 46. A washer 71 is interposed between nut 69 and the end of sleeve 67. Other types of stop structures can be used to hold sleeve 67 on shaft 46.

A universal joint 72 is mounted on the sleeve 67. A key 72A drivably connects the universal joint 72 to sleeve 67. As shown in FIG. 2, telescopically related drive members 73 and 74 connect universal joint 72 with a second universal joint 76. The universal joint 76 is connected to the structure that drives the spinners or distributor discs 26 and 27. This structure includes gear boxes 77 and 78.

Figure 5:
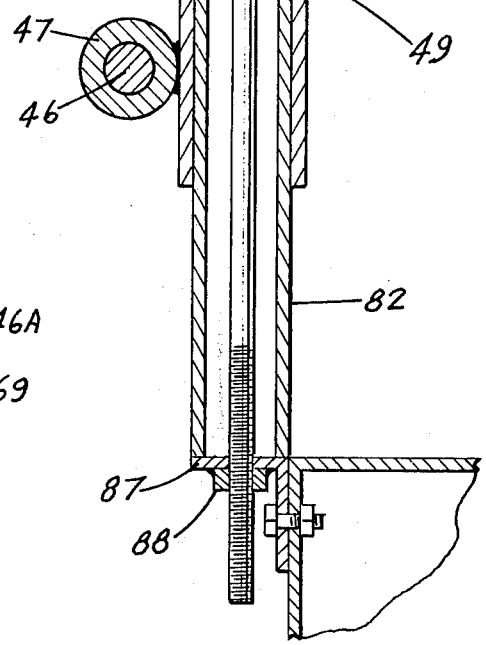
FIG. 5 is an enlarged sectional view taken along line 5—5 of FIG. 2.

Referring to FIG. 5, there is shown adjustable support 49 operable to move and hold the driven gear 44 in driving engagement with drive gear 36 and move gear 44 to a non-driving position away from gear 36. Support 49 comprises tubular members 81 and 82. Member 82 telescopically fits into member 81 so that the length of support 49 can be changed. Member 82 is attached to beam 19 with bolts 51 so that member 82 functions as a fixed guide for the movable member 81. Sleeve 47 is secured to the lower end of member 81 and rotatably carries shaft 46. Gear 44 is mounted on shaft 46. Members 81 and 82 are elongated linear square members whereby member 81 cannot rotate relative to member 82. A plate 83 is secured to the upper end of member 81. An elongated rod 84 extends through end 83 and tubular members 81 and 82. Rod 84 has an enlarged head or bearing portion 86 engageable with the inside face of plate 83. The lower end of rod 84 extends through a hole in plate 87 secured to the lower end of member 82. The rod 84 is threaded into a nut 88 secured by welds or the like to plate 87. A crank 89 is secured to the upper end of rod 84 and projects from the top of end plate 83. The crank 87 is used to rotate the rod and thereby change the length of support 49. Nut 88 can be secured to plate 83 and head 86 can bear against plate 87. A holder, as a spring biased hook (not shown), can be used to hold crank 89 in a fixed position.

In use, the power unit moves the apparatus 10 over the ground. Wheel 17 is thereby rotated. The rotational movement of the wheel 17 is transmitted through the ground wheel drive 34 to the conveyor 23 and the distributing discs 26 and 27. Drive gear 36 rotates driven gear 44. This transmits power via shaft 46 to the chain and sprocket drives 52, 53, 54 and 63, 64, 66. The power from shaft 56 is transmitted via universal joints 58 and 62 and drive members 59 and 61 to the drive roller for the conveyor 23. The power transmitted to sprocket 64 is transferred to the structure for driving the distributing discs 26 and 27 through sleeve member 67, universal joints 72 and 76, and drive members 73 and 74.

Driven gear 44 can be moved to a non-drive position away from gear 36 by extending the length of support 49. Crank 89 is rotated to turn rod 84 whereby rod 84 threaded into nut 88 moves member 81 to increase the length of support 49. Member 81 is guided by and slides on fixed member 82.

The drive or power transmitting apparatus 34 can be used only to operate conveyor 23. Chain 66 is removed so that power is not transmitted to sprocket 63. The distributor discs are driven by other drive structure, as a power take-off from the towing vehicle, a friction wheel drive as shown in U.S. Pat. Nos. 3,085,807 and 3,220,740, or a hydraulic, electric or like motor.

While there has been shown a preferred embodiment of the invention, it is understood that modifications, changes in materials and size relationships between the driving members, drive gear and sprocket assemblies can be made by those skilled in the art without departing from the invention. Also, the drive structures for connecting the conveyor 23 and distributing discs 26 and 27 to shaft 56 and sleeve 67 may include additional power transmitting means, such as pulley and belt drives and gear boxes.

Drive shaft 46 may be drivably connected to sleeve 67 with a pin or key. Sleeve 67 can be deleted and sprockets 52 and 64 and universal joint 72 mounted and keyed directly on shaft 46. The spinner gear boxes 77 and 78 are directly driven from shaft 46. Shaft 56 is driven with either chain 54 or 66. One of the chains is removed. This permits the operator to vary the speed of conveyor 23. When chain 54 is used, conveyor 23 is driven at a slow speed. When chain 66 is used, conveyor 23 is driven at a fast speed. The speed of conveyor 23 is determined by the size differences in the sprockets used with chains 54 or 66.

The embodiments of the invention in which an exclusive property or privilege is claimed are defined as follows:

1. A particulate fertilizer spreader comprising: a hopper for carrying particulate fertilizer and like materials, a frame attached to the hopper, ground engaging wheel means supporting the spreader on the ground, means connecting the wheel means to the frame, a fertilizer distributor assembly mounted on the frame rearwardly of the hopper for spreading fertilizer onto the ground, conveyor means located in said hopper for moving fertilizer from the hopper to the distributor assembly, and power transmitting means connecting the ground engaging wheel means with the conveyor means and distributor assembly for concurrently operating the conveyor means and distributor assembly in response to rotation of the wheel means, said power transmitting means including a first spur gear drivably connected to the wheel means, a second spur gear engageable with the first gear, means drivably connecting the second gear with the conveyor means and distributor assembly, and means selectively adjustable to support the second gear in driving relation with the first gear and to move the second gear to a non-driving position with respect to the first gear, said means adjustably supporting the second gear comprising a first tubular member secured to a part of the means connecting the wheel means to the frame and a second member located in a moving telescopic relation with respect to the first member, means for mounting the second gear on the second member whereby the second gear moves with the second member, and means to move the second member relative to the first member to thereby change the position of the second gear relative to the first gear to either hold the second gear in driving relation with the first gear or locate the second gear in a non-driving relation with respect to the first gear.

2. The spreader of claim 1 wherein: the means drivably connecting the second gear of the power transmission includes a first shaft and second shaft, a first chain and sprocket drive connecting the first shaft carrying the second gear with the second shaft, first drive means connecting the second shaft with the conveyor means, a second chain and sprocket drive connecting the second shaft with a sleeve rotatably mounted on the first shaft, and second drive means connecting the sleeve with the distributor assembly.

3. The spreader of claim 1 wherein: the wheel means includes a wheel having a rim, a plurality of ears secured to the rim, a plate member attached to the ears, and means connecting the plate member and the first gear.

4. The spreader of claim 1 including: means connecting the first gear with the wheel means whereby the first gear rotates with the wheel means.

5. The spreader of claim 1 wherein: the means drivably connecting the second gear with the conveyor means and distributor assembly includes a first shaft carrying the second gear, a second shaft, sleeve means rotatably mounted on the second shaft, first drive means connecting the first shaft with the second shaft, and a second drive means connecting the second shaft with the sleeve means, and means connecting the sleeve means with the distributor assembly whereby rotation of the sleeve means will drive the distributor assembly.

6. The spreader of claim 1 wherein: the means drivably connecting the second gear of of the power transmission includes a first drive means connected to the second gear and distributor assembly, a second drive means connected to the conveyor means, and means for transmitting power from the first drive means to the second drive means.

7. The spreader of claim 1 wherein: the means to move the second member relative to the first member includes a rod longitudinally extended through said first and second members, said rod having means rotatably mounting the rod on one of the members, and threaded means on the other member to accommodate a threaded portion of the rod whereby on rotation of the rod the second member moves relative to the first member.

8. An apparatus for distributing material comprising: means for carrying material, ground engaging wheel means supporting the means for carrying material, material dispensing means operable to distribute material onto a location, conveyor means for moving material from the means for carrying material to the material dispensing means, and power transmitting means connecting the wheel means with the conveyor means and material dispensing means whereby rotation of the wheel means drives the conveyor means and material dispensing means, said power transmitting means including drive gear means attached to the wheel means, and driven gear means engageable with the drive gear means, and means drivably connecting the driven gear means with the conveyor means and material dispensing means, support means adjustably supporting the driven gear means in driving relation with the drive gear means and to move the driven gear means to a non-driving location away from the drive gear means, said support means including a first member and a second member located in a moving relationship with respect to the first member, means for mounting the driven gear means on the second member whereby the driven gear means moves with the second member, and means to move the second member relative to the first member to thereby change the position of the driven gear means relative to the drive gear means to either hold the driven gear means in driving relation with the drive gear means or locate the driven gear means in a nondriving relationship with respect to the drive gear means.

9. The apparatus of claim 8 wherein: the means drivably connecting the driven gear means includes a first drive means connected to the driven gear means and material dispensing means, a second drive means connected to the conveyor means, and means for transmitting power from the first drive means to the second drive means.

10. The apparatus of claim 8 wherein: the means drivably connecting the driven gear means to the conveyor means and material dispensing means includes a first shaft carrying the driven gear means, a second shaft, a sleeve rotatably mounted on the first shaft, first drive means connecting the first shaft with the second shaft, second drive means connecting the second shaft with the conveyor means, third drive means connecting the second shaft with the sleeve rotatably mounted on the first shaft, and fourth drive means connecting the sleeve with the material dispensing means.

11. The apparatus of claim 8 wherein: the wheel means includes a wheel having a rim, a plurality of ears secured to the rim, a plate member attached to the ears, and means connecting the plate member with the drive gear means.

12. The apparatus of claim 8 including: means connecting the drive gear means with the wheel means whereby the drive gear means rotates with the wheel means.

13. The apparatus of claim 8 wherein: the means to move the second member relative to the first member includes a rod longitudinally extended through said first and second members, said rod having means rotatably mounting the rod on one of the members and threaded means on the other member to accommodate a threaded portion of the rod whereby on rotation of the rod the second member moves relative to the first member.

14. An apparatus for distributing material comprising: means for carrying material, ground engaging wheel means supporting the means for carrying material, material dispensing means operable to distribute material onto a location, conveyor means for moving material from the means for carrying material to the material dispensing means, and power transmitting means connecting the wheel means with the conveyor means whereby rotation of the wheel means drives the conveyor means, said power transmitting means including the drive gear means attached to the wheel means and driven gear means engageable with the drive gear means, means drivably connecting the driven gear means with the conveyor means and material dispensing means, means selectively adjustable to support the driven gear means in driving relation with the drive gear means and to move the driven gear means to a position wherein the driven gear means is disengaged from the drive gear means, said means adjustably supporting the driven gear means comprising a first member and second member, said second member being movably mounted on the first member, means mounting the driven gear means on the second member, and means to move the second member relative to the first member and thereby change the position of the driven gear means relative to the drive gear means.

15. The apparatus of claim 14 wherein: the means drivably connecting the driven gear means includes a first drive means connected to the driven gear means and material dispensing means, a second drive means connected to the conveyor means, and means for transmitting power from the first drive means to the second drive means.

16. The apparatus of claim 14 wherein: the means drivably connecting the driven gear means to the conveyor means and material dispensing means includes a first shaft carrying the driven gear means, a second shaft, first drive means connecting the first shaft with the second shaft, and second drive means connecting the second shaft with the conveyor means.

17. The apparatus of claim 16 including: sleeve means rotatably mounted on the first shaft, third drive means connecting the second shaft with the sleeve means, and fourth drive means connecting the sleeve means with the material dispensing means.

18. The apparatus of claim 14 wherein: the wheel means includes a wheel having a rim, a plurality of ears secured to the rim, a plate member attached to the ears, and means connecting the plate member with the drive gear means.

19. The apparatus of claim 14 including: means connecting the drive gear means with the wheel means whereby the drive gear means rotates with the wheel means.

20. An apparatus for distributing material comprising: means for carrying material, ground engaging wheel means supporting the means for carrying material, material dispensing means operable to distribute material onto a location, conveyor means for moving material from the means for carrying material to the material dispensing means, and power transmitting means connecting the wheel means with the conveyor means whereby rotation of the wheel means drives the conveyor means, said power transmitting means including drive gear means attached to the wheel means and driven gear means engageable with the drive gear means, means drivably connecting the driven gear means with the conveyor means, said means drivably connecting the driven gear means to the conveyor means including a first shaft carrying the driven gear means, a second shaft, first drive means connecting the first shaft with the second shaft, second drive means connecting the second shaft with the conveyor means, means selectively adjustable to support the driven gear means in driving relation with the drive gear means and move the driven gear means to a position wherein the driven gear means is disengaged from the drive gear means, said means adjustably supporting the driven gear means comprising a first member and a second member, said second member being movably mounted on the first member, means mounting the driven gear means on the second member, and means to move the second member relative to the first member and thereby change the position of the driven gear means relative to the drive gear means.

21. The apparatus of claim 20 including: third drive means connecting the first shaft with the material dispensing means.

22. The apparatus of claim 20 wherein: said means to move the second member relative to the first member includes a rod having a threaded portion, means rotatably mounting the rod on one of the members, and thread means on the other member accommodating the threaded portion of the rod whereby on rotation of the rod the second member moves relative to the first member.

23. The apparatus of claim 20 including: means securing the first member to a fixed part of the apparatus thereby fixing the position of the first member so that the second member moves relative to the first member.

24. The apparatus of claim 20 wherein: the wheel means includes a wheel having a rim, a plurality of ears secured to the rim, a plate member attached to the ears, and means connecting the plate member to the drive gear means.

25. The apparatus of claim 20 including: means connecting the drive gear means with the wheel means whereby the drive gear means rotates with the wheel means.

26. An apparatus for distributing material comprising: means for carrying material, ground engaging wheel means supporting the means for carrying material, material dispensing means operable to distribute material onto a location, conveyor means for moving material from the means for carrying material to the material dispensing means, and power transmitting means connecting the wheel means with the conveyor means whereby rotation of the wheel means drives the conveyor means, said power transmitting means including drive gear means attached to the wheel means and driven gear means engageable with the drive gear means, and means drivably connecting the driven gear means with the conveyor means, said means drivably connecting the driven gear means to the conveyor means including a first shaft carrying the driven gear means, a second shaft, first drive means connecting the first shaft with the second shaft, and second drive means connecting the second shaft with the conveyor means, support means adjustably supporting the driven gear means in driving relation with the drive gear means and to move the driven gear means to a nondriving location away from the drive gear means, said support means including a first member and a second member located in a moving relationship with respect to the first member, means for mounting the driven gear means on the second member whereby the driven gear means moves with the second member, and means to move the second member relative to the first member to thereby change the position of the driven gear means relative to the drive gear means to either hold the driven gear means in a driving relation with the drive gear means or locate the driven gear means in a nondriving relationship with respect to the drive gear means.

27. The apparatus of claim 26 wherein: the means to move the second member relative to the first member includes a rod longitudinally extended through said first and second members, said rod having means rotatably mounting the rod on one of the members and thread means on the other member to accommodate a threaded portion of the rod whereby on rotation of the rod the second member moves relative to the first member.

* * * * *